(12) United States Patent
Pinto (10) Patent No.: US 11,956,318 B2
(45) Date of Patent: Apr. 9, 2024

(54) SYSTEMS AND METHODS FOR EPC PROCESSING

(71) Applicant: Kajeet, Inc., McLean, VA (US)

(72) Inventor: David H. Pinto, Rockville, MD (US)

(73) Assignee: KAJEET, INC., McLean, VA (US)

( * ) Notice: Subject to any disclaimer, the term of this patent is extended or adjusted under 35 U.S.C. 154(b) by 230 days.

(21) Appl. No.: 17/715,765

(22) Filed: Apr. 7, 2022

(65) Prior Publication Data

US 2023/0328140 A1  Oct. 12, 2023

(51) Int. Cl.
| | |
|---|---|
| H04L 67/141 | (2022.01) |
| H04L 12/46 | (2006.01) |
| H04W 8/20 | (2009.01) |
| H04W 12/06 | (2021.01) |
| H04W 12/72 | (2021.01) |
| H04W 76/10 | (2018.01) |

(52) U.S. Cl.
CPC ........ *H04L 67/141* (2013.01); *H04L 12/4633* (2013.01); *H04W 8/205* (2013.01); *H04W 12/06* (2013.01); *H04W 12/72* (2021.01); *H04W 76/10* (2018.02)

(58) Field of Classification Search
None
See application file for complete search history.

(56) References Cited

U.S. PATENT DOCUMENTS

| | | | |
|---|---|---|---|
| 7,881,697 B2 | 2/2011 | Baker et al. | |
| 7,899,438 B2 | 3/2011 | Baker et al. | |
| 7,945,238 B2 | 5/2011 | Baker et al. | |
| 8,078,140 B2 | 12/2011 | Baker et al. | |
| 8,285,249 B2 | 10/2012 | Baker et al. | |
| 8,634,801 B1 | 1/2014 | Baker et al. | |
| 8,712,371 B2 | 4/2014 | Baker et al. | |
| 10,694,346 B1 | 6/2020 | Baker et al. | |
| 2018/0145982 A1* | 5/2018 | Wang | H04W 12/062 |
| 2021/0258868 A1* | 8/2021 | Wong | H04L 67/00 |

OTHER PUBLICATIONS

Curpen, Radu, et al. "Solutions for Roaming and Interoperability Problems Between LTE and 2G or 3G Networks." Review of the Air Force Academy 2 (2013): 29.*

* cited by examiner

*Primary Examiner* — Glenton B Burgess
*Assistant Examiner* — Gregory P Tolchinsky
(74) *Attorney, Agent, or Firm* — BakerHostetler (57) ABSTRACT

A system and method for managing a user equipment (UE) device coupled to a network serviced by a service provider in which standard Internet Protocol (IP) traffic, that is not LTE traffic, is received from a network serviced by a service provider that was generated by the UE device having an IP address that causes the standard IP traffic to be routed to an evolved packet core (EPC) proxy unit. The EPC proxy unit identifies the IMSI for the UE device, requests a standard session from an EPC system based on the IMSI, and initiates a tunnel connection to a serving gateway for advanced processing by the EPC system. After advance processing has been performed, usage management and policy enforcement may be performed on the standard IP traffic prior to allowing the UE device to access a public data network.

14 Claims, 5 Drawing Sheets

SYSTEMS AND METHODS FOR EPC PROCESSING

CROSS REFERENCE TO RELATED APPLICATIONS

N/A

TECHNICAL FIELD

The present invention is directed to the real-time management of the parameters, permissions and status of local and mobile devices.

BACKGROUND

Standard Internet Protocol ("IP") traffic ("standard IP traffic") from User Equipment (UE) served by mobile network operators ("MNOs"), referred to herein as "bearer path" or "bearer path traffic", can be routed and processed for a variety of different reasons, such as billing, or applying usage and content policies. In 2G and 3G network architectures, the standard IP traffic includes voice traffic that is circuit-switched, and data traffic that is packet-switched through a General Packet Radio Service ("GPRS"). 2G and 3G standard IP traffic is not LTE/4G/5G traffic. The evolved packet core ("EPC") system of the long-term evolution ("LTE") 4G network architecture and the 5G core ("5GC") of the 5G network architecture treat data over the network like any other IP application. EPC/5GC processing systems include a number of advanced processing capabilities that can be performed on LTE traffic, such as real-time quota management, the ability to throttle traffic speeds, quality of service guarantees related to latency, throughput, jitter, etc. (referred to herein as "advanced processing"). The advanced processing cannot be performed on standard IP traffic because it lacks the LTE control data that is an integral part of the LTE traffic protocols. It is therefore desirable to find a solution that will enable standard IP traffic to be processed by EPC processing systems in the same manner as LTE traffic.

SUMMARY

A system and method for managing a user equipment (UE) device coupled to a network serviced by a service provider in which standard Internet Protocol (IP) traffic, that is not LTE traffic, is received from a network serviced by a service provider that was generated by the UE device having an IP address that causes the standard IP traffic to be routed to an evolved packet core (EPC) proxy unit. The EPC proxy unit identifies the IMSI for the UE device, requests a standard session from an EPC system based on the IMSI, and initiates a GTP tunnel connection to a serving gateway for advanced processing by the EPC system. After advance processing has been performed, usage management and policy enforcement may be performed on the standard IP traffic prior to allowing the UE device to access a public data network.

DETAILED DESCRIPTION OF ILLUSTRATIVE EMBODIMENTS

EPC systems have a number of subcomponents including Mobility Management Entity ("MIME") units, Serving GateWay ("SGW") units, Packet Data Network Gateway ("PGW") units, the Home Subscriber Server ("HSS") units, and the Policy and Charging Rules Function ("PCRF") units. The MME is the key control-node for the LTE access-network. The MME is in charge of the control-plane functions related to subscriber and session management and support security procedures, terminal-to-network session handling, idle terminal location management and more.

The SGW routes and forwards user data packets and acts as the mobility anchor for inter-evolved Node B (a.k.a., eNodeB or eNB) handovers (i.e., transitioning a connection between a mobile device or User Equipment ("UE") device and one eNB to a different eNB) and the mobility anchor between LTE and other 3GPP technologies (e.g., relaying traffic between 2G/3G systems and a PGW). The PGW provides connectivity from the UE device to external packet data networks by being a point of entry and exit of traffic. The PGW enables packet filtering for each user, packet screening and other functions.

The HSS is a central database that contains user-related and subscription-related information. The HSS is responsible for mobility management, call and session establishment support, user authentication and access authorization. The PCRF supports service data flow, policy enforcement, and flow-based charging.

Figure 1:
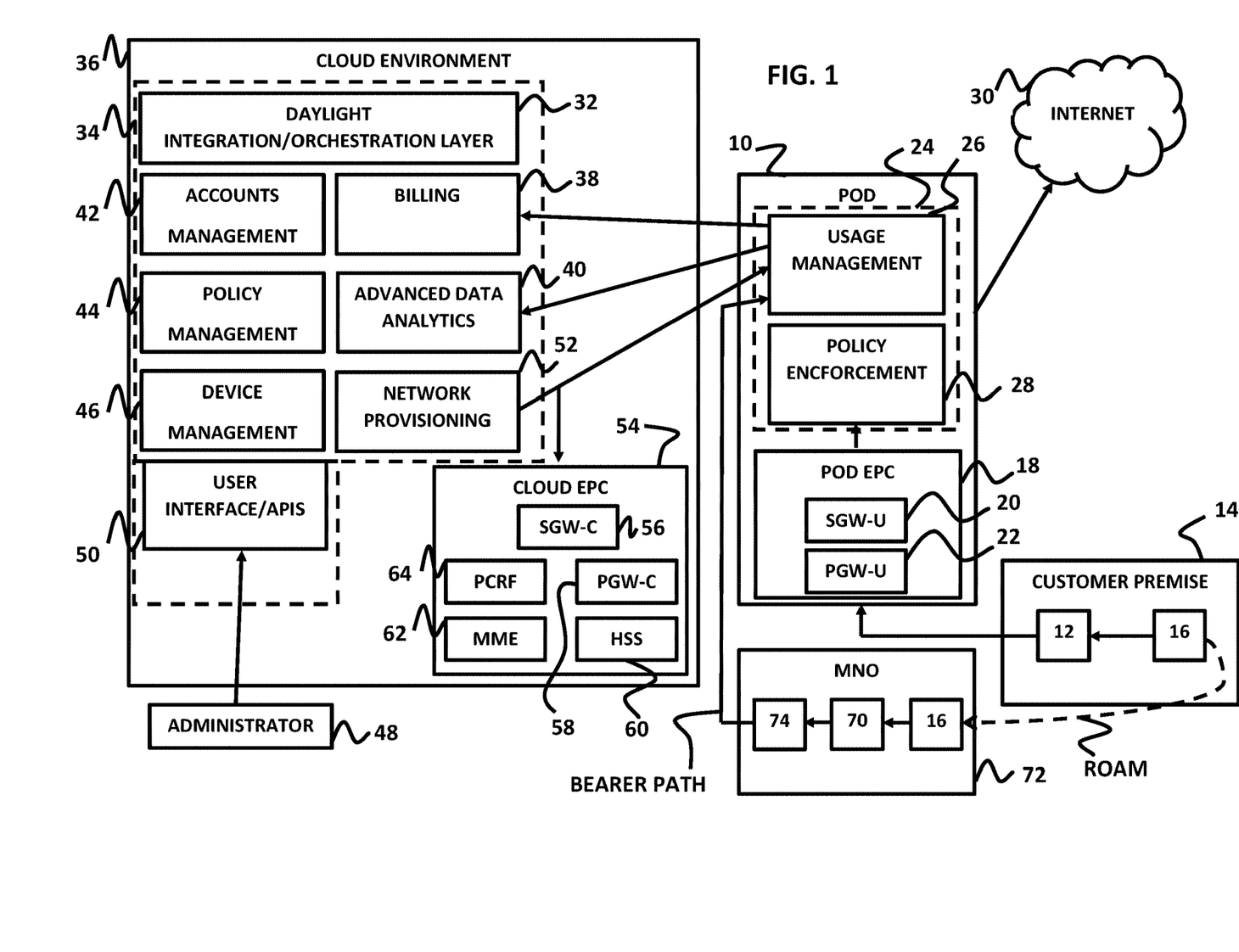
FIG. 1 is a block diagram providing an exemplary system illustrating how private LTE traffic and bearer path traffic may be processed for usage management and policy enforcement.

The eNB provides a wireless connection between a mobile device and the LTE network. As illustrated in FIG. 1, the eNB 12 uses the S1 interface to connect the eNB to the EPC of a pod 10 that provisions any UE device connected to the network and performs usage management and policy enforcement as further described herein. The S1 interface may be split between the control-plane (S1-MME), which determines how data packets are to be forwarded from one place to another, and the user-plane (S1-U), which actually forwards the data packets. FIG. 1 shows the eNB 12, which is part of a private LTE network 14, transferring data packets from UE device 16 via S1-U to pod EPC unit 18. Although the pod EPC unit 18 is only shown in FIG. 1 with a SGW unit 20 and PGW unit 22 for the user data packets (hence SGW-U and PGW-U), the pod EPC unit 18 would also include the other subcomponent units of an EPC as previously described herein, and as more fully illustrated in FIG. 3.

The pod EPC unit 18 processes the S1-U traffic from the UE device 16 and forwards the traffic on to a management and enforcement unit 24 that includes a usage management unit 26 and a policy enforcement unit 28. The management and enforcement unit 24 may operate in a manner similar to the policy enforcement point described in any of U.S. Pat. Nos. 10,694,346, 8,712,371, 8,634,801, 8,285,249, 8,078, 140, 7,899,438, 7,945,238, 7,881,697 and other related patents, which disclosures are incorporated herein by reference. After managing and/or filtering the S1-U traffic, the resulting filtered traffic is forward by the PGW unit 22 to the Internet 30.

The management and enforcement unit 24 may also extract usage data and traffic data and send that data to other applications that are part of a daylight integration and orchestration layer 32 of an application stack 34 in a cloud environment 36 that provides a variety of different services. Those services are provided through a billing unit 38, an advanced data analytics unit 40, an accounts management unit 42, a policy management unit 44 and a device management unit 46. Policy management unit 44 and device management unit 46 may be the administrative tools that enable the management and enforcement unit 24 to perform as desired, such as by providing various rules and/or policies related to usage, limits, etc.. Such administration may be performed by an administrator system 48 that accesses the application stack 34 via a user interface and/or various API 50. The application stack 34 may also include an LTE network provisioning unit 52 that provides provisioning for UE devices accessing the LTE network, as well as for the cloud EPC unit 54. As described herein, the cloud IPC 54 may include its own SGW unit 56, PGW unit 58, HSS unit 60, MME unit 62 and PCRF unit 64 and operate in the same manner as pod EPC unit 18.

When a UE device, such as UE 16, currently roams from a private LTE network, such as private LTE network 14, and connects to an antenna 70 of an MNO 72, the EPC 74 of the MNO 72 may process the standard IP traffic from the UE device 16 and forward that as the bearer path traffic directly to the usage management unit 26. As noted herein, this is not desirable, however, because the pod EPC unit 18 is not able to process the standard IP traffic in order to take advantage of advanced processing, such as real-time quota management, the ability to throttle traffic speeds, quality of service guarantees related to latency, throughput, jitter, etc.

Figure 2:
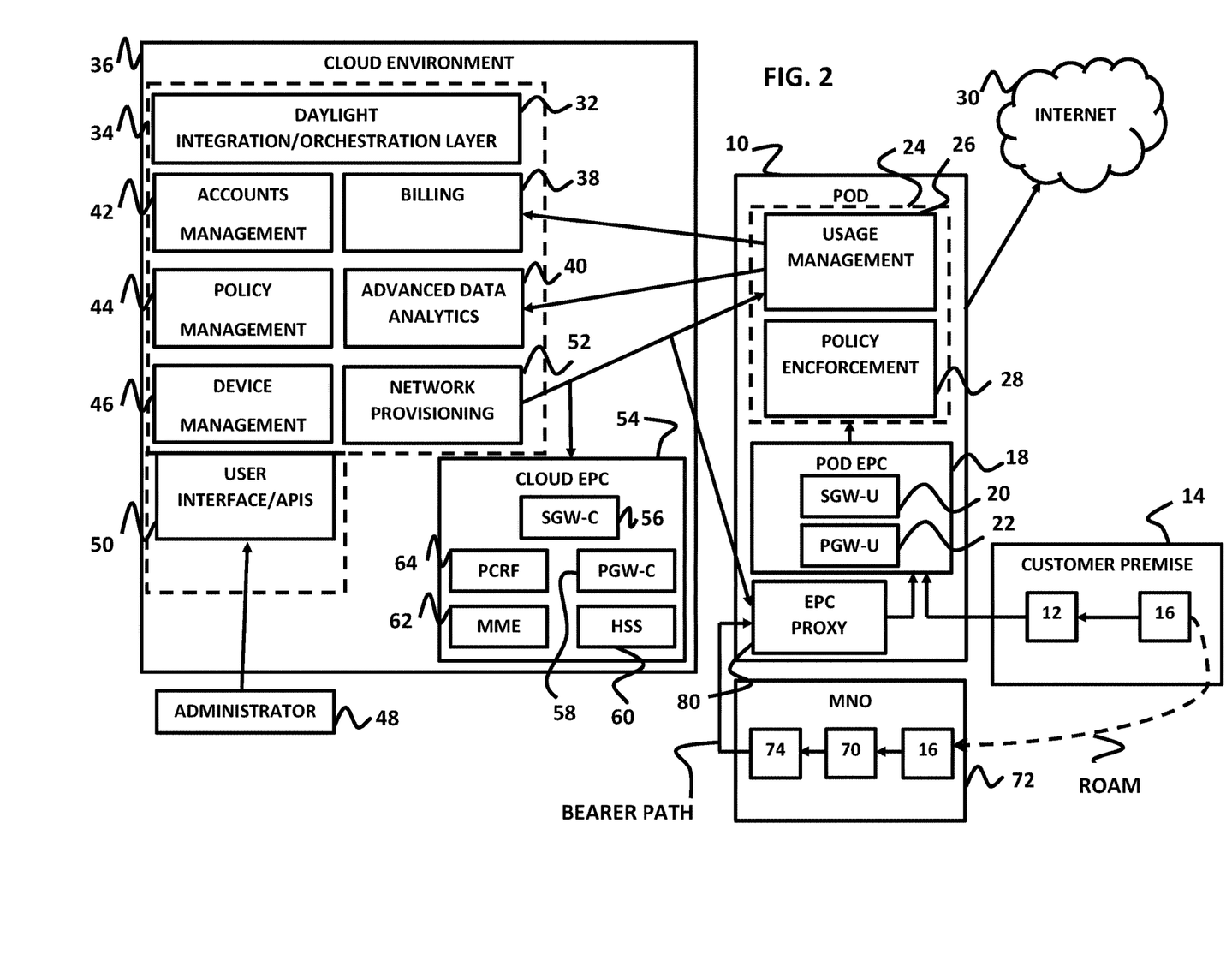
FIG. 2 is a block diagram providing an exemplary system illustrating the integration of an EPC proxy unit in the system of FIG. 1.

FIG. 2 illustrates an embodiment that is identical to that of FIG. 1, except that the bearer path traffic of the UE device 16 from EPC 74 is routed to EPC proxy unit 80. When a new subscriber is added to the application stack 34, as part of the mobile device activation process for the new subscriber, an IP address is assigned to their mobile device and stored in the application stack 34. This IP address is then provisioned to pod 10, and the EPC proxy unit 80 along with the International Mobile Subscriber Identity ("IMSI") that was assigned to the SIM card of the mobile device that will be used by the new subscriber, as more fully described herein, so that the bearer path traffic will be sent to the EPC proxy unit 80 and then on to the pod EPC unit 18. The pod EPC unit 18 may then apply advanced processing features, such as throttling, Quality of Service ("QoS"), quota management, etc., on the traffic. Once the advanced processing features have been applied, the traffic is processed in the same manner as otherwise described herein for policy enforcement and usage management by the management and enforcement unit 24 and other processing by the application stack 34.

Figure 3:
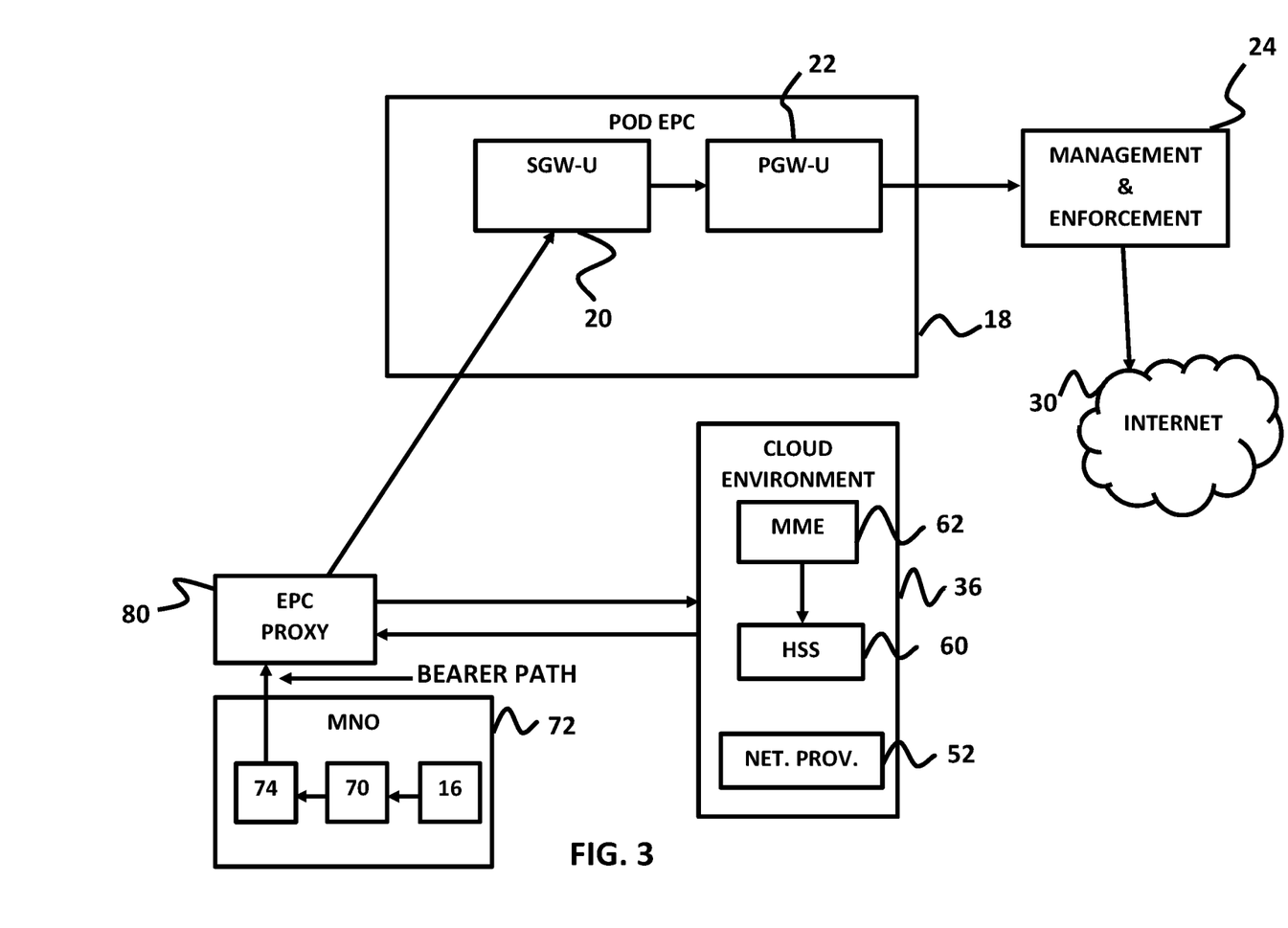
FIG. 3 is a block diagram providing a more specifically detailed illustration of the integration of the EPC proxy unit of FIG. 2.

FIG. 3 provides a simplified version of FIG. 2 so a more detailed explanation may be provided of how the EPC proxy unit 80 handles the bearer path traffic of UE device 16 from the MNO 72 in real-time and interacts with the other elements of the pod EPC unit 18. The EPC proxy unit 80 must handle or manage the standard IP traffic (bearer path traffic) in real-time so there is no noticeable delay in the managed functions of the UE device, such as the amount of time it takes to access an IP address, etc. As described herein, the components of the cloud environment 36 provide a number of different services, including provisioning. As illustrated in FIG. 2, the network provisioning unit 52 of the application stack 34 of the cloud environment 36 may provision the cloud EPC unit 54 and the EPC proxy unit 80 with the IP of the UE device 16 as well as the IMSI that identifies the SIM for the UE device 16.

Once provisioned, the EPC proxy unit 80 may attempt to initiate a session for the IMSI and the IP of the UE device 16 with the MME unit 62, such as follows:

s1ap_eNB_generate_s1_setup_request( )
s1ap_eNB_generate_initial_ue_message( )
s1ap_eNB_ue_capabilities( )
s1ap_eNB_handle_s1_setup_response( )
s1ap_mme_handle_ue_cap_indication( )

Thereafter, when the MNO 72 generates bearer path traffic which includes the UE device 16 traffic, it will be routed to EPC proxy 80. The EPC proxy unit 80 will look up the IMSI for UE device 16 based on source IP address of the incoming traffic and interact with the MME 62 in much the same way a cell of a 4G/5G network would interact with the MME in order to set up a session for the UE device 16 that has roamed onto its network. As a result of essentially mimicking the cell, the MME 62 will see the request from the EPC proxy 80 to set up a session as a standard session initiation request and will handle that request with the rest of the EPC components, including the HSS 60, the SGW-U 20, and the PGW-U 22. The EPC proxy unit 80 may also establish a General Packet Radio Service ("GPRS") Tunnelling Protocol ("GTP") tunnel with the SGW unit 20 per UE device IP address. The tunnel enables GPRS traffic, i.e., standard IP traffic, within an LTE network, thereby making it possible to pass the traffic form the UE device 16 through the tunnel to the serving gateway SGW unit 20 for advanced processing and in order to perform one or more of usage management and policy enforcement by the management and enforcement unit 24 before being set to the Internet 30.

Figure 4:
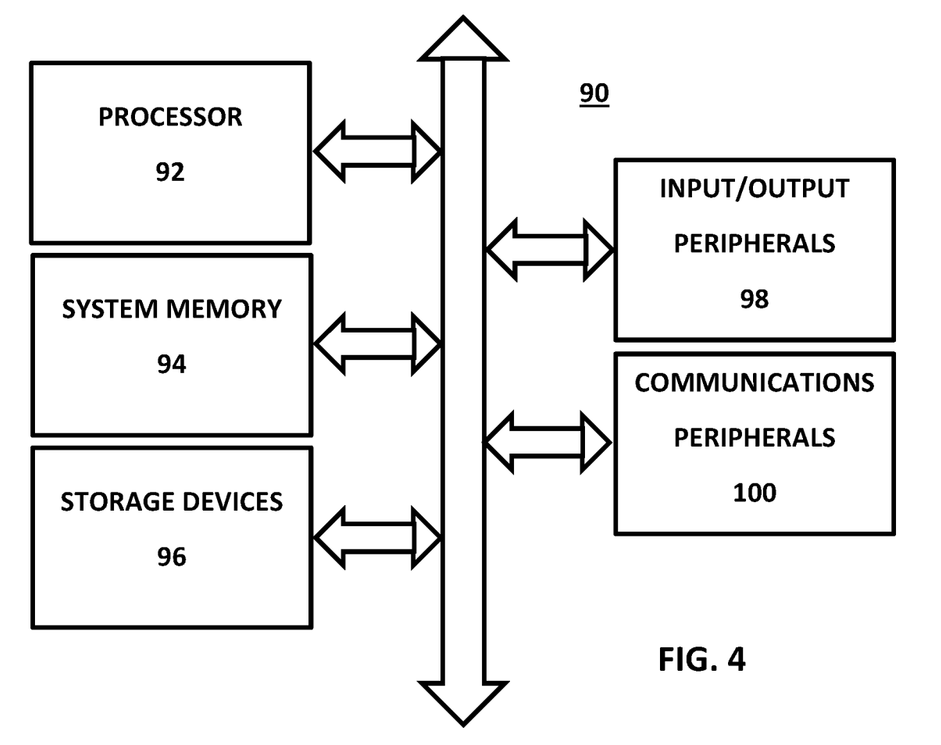
FIG. 4 depicts an exemplary computing system.

FIG. 4 depicts an exemplary computing system 90. Some of the operations described herein may be implemented on a wide variety of computing environments similar to computing system 90, such as commodity-hardware computers, virtual machines, computing clusters and computing appliances, and cloud computing. Any of these computing devices or environments may be referred to as computing nodes or systems.

In a basic configuration, the computing device may include at least a processor 92, a system memory 94, storage devices 96, input/output peripherals 98, communication peripherals 100, and an interface bus connecting these various components. The interface bus may be configured to communicate, transmit, and transfer data, controls, and commands between the various components of the computing device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The input/output peripherals 98 include user interfaces, such as a keyboard, screen, microphone, speaker, touch-screen interface, other input/output devices, and computing components—such as digital-to-analog and analog-to-digital converters, graphical processing units, serial ports, parallel ports, universal serial bus, transmitter, receiver, etc. The input/output peripherals 98 may be connected to the processor through any of the ports coupled to the interface bus.

Finally, the communication peripherals 100 of the computing device are configured to facilitate communication between the computing device and other computing devices (e.g., between the computing device and the server) over a communications network. The communication peripherals include, for example, a network interface controller, modem, various modulators/demodulators and encoders/decoders, wireless and wired interface cards, antenna, etc.

The communication network includes a network of any type that is suitable for providing communications between the computing device and the server, and may comprise a combination of discrete networks, which may use different technologies. For example, the communications network includes a cellular network (i.e., 2G/3G/4G/5G), a Wi-Fi/broadband network, a local area network (LAN), a wide area network (WAN), a telephony network, a fiber-optic network, or combinations thereof. In an example embodiment, the communication network includes the Internet and any networks adapted to communicate with the Internet. The communications network may also be configured as a means for transmitting data between the computing device and the server.

Figure 5:
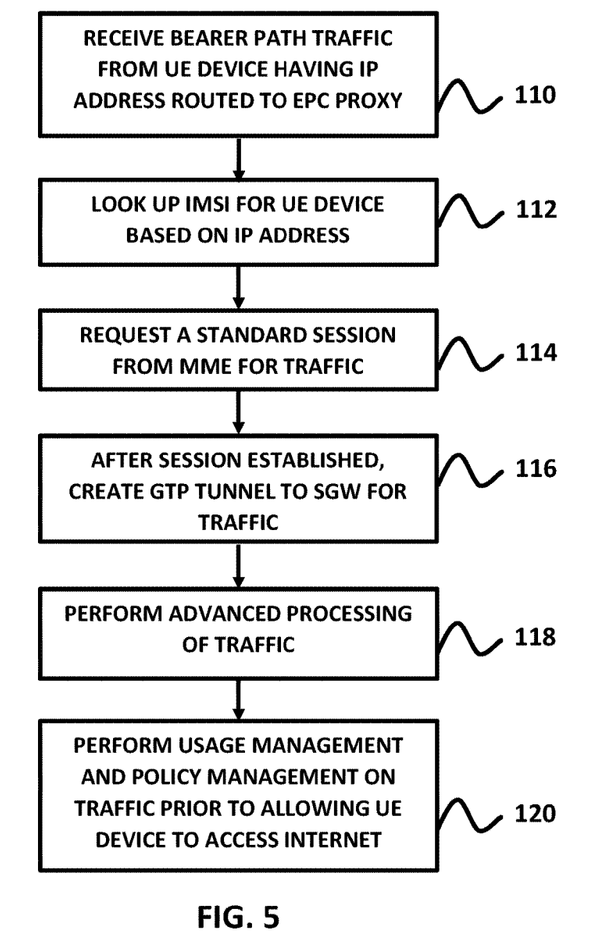
FIG. 5 depicts an exemplary method of managing a computing device.

By way of example, processor 92 may execute instructions from system memory 94 that enable processor 92 to manage a UE device, such as instructions that implement the method of FIG. 5 and that enable operation of the various units described herein. The instructions may originally be stored in storage device 96, copied to system memory 94 to be run on the processor 92, and additional code cache copies of the potential malware may also be made in system memory 94.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps, including creation of or changes to a billing services account, may be stored, persistently or otherwise, in any type of non-transitory computer storage such as, e.g., volatile or non-volatile storage.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

FIG. 5 provides an exemplary illustration of the real-time management of a UE device coupled to a network serviced by a service provider. In Step 110, IP traffic is received from the network that was generated by the UE device. The UE device would have an IP address and other identify information that enables it to access the network and causes the traffic to be routed to the EPC proxy as bearer path traffic. In Step 112, the EPC proxy looks up the IMSI for the UE device based on the IP address of the traffic. The EPC proxy and the HSS are provisioned with the IP and the IMSI for the UE device. The EPC proxy will look up the IP in its own database and if it is there, it will pull the IMSI for that IP and attempt to establish a session by communicating with the MME. Hence, in Step 114, the EPC proxy makes the request for standard session initiation to the MME of the pod EPC. In Step 116, after the session is established, create a general packet radio service tunnelling protocol tunnel between the EPC proxy unit that receives the traffic from the network and the serving gateway. In Step 118, advance processing may then be performed on the traffic. In Step 120, usage management and policy management may be performed on the traffic prior to permitting to advance to the Internet.

The method may further include provisioning the HSS of the EPC with the following information: an identification of the UE device, an identification of a service of the UE device, and an identification of a packet data network gateway through which the UE device can access the Internet.

In an embodiment, a system for real-time managing a user equipment (UE) device configured to communicate over a network serviced by a service provider, the system comprising a memory bearing instructions that, when executed on the system, cause the system to at least: receive from the network at an Evolved Pocket Core (EPC) proxy unit standard Internet Protocol (IP) traffic, that is not LTE traffic, that was generated by the UE device, the UE device having an IP address, wherein the IP address is routed to the EPC proxy unit; identify an International Mobile Subscriber Identity (IMSI) for the UE device based on the IP address; request of an EPC system through the EPC proxy unit a standard session initiation based on the IMSI for the UE device; initiate a connection between the EPC proxy unit and a serving gateway of the EPC system for the standard IP traffic; perform advanced processing on the standard IP traffic by the EPC system; and perform one or more of usage management and policy enforcement on the standard IP traffic prior to allowing the UE device to access a public data network, as well as after allowing the UE device to access a public data network.

In the embodiment, wherein the instructions that, when executed on the system, cause the system to initiate the connection between the EPC proxy unit and the serving gateway further cause the system to establish a general packet radio service tunnelling protocol tunnel between the EPC proxy unit and the serving gateway through which the standard IP traffic is passed.

In the embodiment, wherein the request through the EPC proxy unit further includes instructions that, when executed on the system, cause the system to interrogate a home subscriber server (HSS) with a mobility management entity (MME) of the EPC system in order to authenticate the IMSI of the UE device.

In the embodiment, wherein the instructions that, when executed on the system, further cause the system to provision a home subscriber server (HSS) with information of an identification of the UE device, an identification of a service of the UE device, and an identification of a packet data network gateway through which the UE device can access the Internet.

In the embodiment, wherein the advanced processing of the EPC system includes one or more of real-time quota management, an ability to throttle traffic speeds, and quality of service.

In the embodiment, wherein the quality of service includes guarantees related to latency, throughput and jitter.

In an embodiment, a non-transitory computer readable storage medium comprising instructions for real-time managing a user equipment (UE) device configured to be operatively coupled to a network serviced by a service provider, the medium comprising computer readable instructions that, when executed on a system, cause the system to at least: receive from the network at an Evolved Pocket Core (EPC) proxy unit standard Internet Protocol (IP) traffic, that is not LTE traffic, that was generated by the UE device, the UE device having an IP address, wherein the IP address is routed to the EPC proxy unit; identify an International Mobile Subscriber Identity (IMSI) for the UE device based on the IP address; request of an EPC system through the EPC proxy unit a standard session initiation based on the IMSI for the UE device; initiate a connection between the EPC proxy unit and a serving gateway of the EPC system for the standard IP traffic; perform advanced processing on the standard IP traffic by the EPC system; and perform one or more of usage management and policy enforcement on the standard IP traffic prior to allowing the UE device to access a public data network and after allowing the UE device to access a public data network.

In the embodiment, wherein the instructions that, when executed on the system, cause the system to initiate the connection between the EPC proxy unit and the serving gateway further cause the system to establish a general packet radio service tunnelling protocol tunnel between the EPC proxy and the serving gateway through which the standard IP traffic is passed.

In the embodiment, wherein the request through the EPC proxy unit further includes instructions that, when executed on the system, cause the system to interrogate a home subscriber server (HSS) with a mobility management entity (MME) of the EPC system in order to authenticate the IMSI of the UE device.

In the embodiment, wherein the instructions that, when executed on the system, further cause the system to provision a home subscriber server (HSS) with information of an identification of the UE device, an identification of a service of the UE device, and an identification of a packet data network gateway through which the UE device can access the Internet.

In an embodiment, a method executed on a computing system for real-time managing a user equipment (UE) device coupled to a network serviced by a service provider, the method comprising: receiving from the network at an Evolved Pocket Core (EPC) proxy unit standard Internet Protocol (IP) traffic, that is not LTE traffic, that was generated by the UE device, the UE device having an IP address, wherein the IP address is routed to the EPC proxy; unit identifying an International Mobile Subscriber Identity (IMSI) for the UE device based on the IP address; requesting of an EPC system through the EPC proxy unit a standard session initiation based on the IMSI for the UE device; initiating a connection between the EPC proxy unit and a serving gateway of the EPC system for the standard IP traffic; performing advanced processing on the standard IP traffic by the EPC system; and performing one or more of usage management and policy enforcement of the standard IP traffic prior to allowing the UE device to access a public data network.

In the embodiment, wherein the initiating a connect between the EPC proxy unit and the serving gateway includes causing the system to establish a general packet radio service tunnelling protocol tunnel between the EPC proxy unit and the serving gateway through which the standard IP traffic is passed.

In the embodiment, wherein the requesting through the EPC proxy unit further includes interrogating a home subscriber server (HSS) with a mobility management entity (MME) of the EPC system in order to authenticate the IMSI of the UE device.

In the embodiment, wherein the method further comprises provisioning a home subscriber server with information of an identification of the UE device, an identification of a service of the UE device, and an identification of a packet data network gateway through which the UE device can access the Internet.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exorcised from the combination, and the claimed combination may be directed to a subcombination or a variation of a subcombination.

What is claimed:

1. A system for real-time managing a user equipment (UE) device configured to communicate over a network serviced by a service provider, the system comprising a memory bearing instructions that, when executed on the system, cause the system to at least:
   receive from the network at an Evolved Packet Core (EPC) proxy unit standard Internet Protocol (IP) traffic, that is not LTE traffic, that was generated by the UE device, the UE device having an IP address, wherein the IP address is routed to the EPC proxy unit;
   identify an International Mobile Subscriber Identity (IMSI) for the UE device based on the IP address;
   request of an EPC system through the EPC proxy unit a standard session initiation based on the IMSI for the UE device;
   initiate a connection between the EPC proxy unit and a serving gateway of the EPC system for the standard IP traffic;
   perform advanced processing on the standard IP traffic by the EPC system; and
   perform one or more of usage management and policy enforcement on the standard IP traffic prior to allowing the UE device to access a public data network and after allowing the UE device to access a public data network.

2. The system of claim 1, wherein the instructions that, when executed on the system, cause the system to initiate the connection between the EPC proxy unit and the serving gateway further cause the system to establish a general packet radio service tunnelling protocol tunnel between the EPC proxy unit and the serving gateway through which the standard IP traffic is passed.

3. The system of claim 1, wherein the request through the EPC proxy unit further includes instructions that, when executed on the system, cause the system to interrogate a home subscriber server (HSS) with a mobility management entity (MME) of the EPC system in order to authenticate the IMSI of the UE device.

4. The system of claim 1, wherein the instructions that, when executed on the system, further cause the system to provision a home subscriber server (HSS) with information of an identification of the UE device, an identification of a service of the UE device, and an identification of a packet data network gateway through which the UE device can access the Internet.

5. The system of claim 1, wherein the advanced processing of the EPC includes one or more of real-time quota management, an ability to throttle traffic speeds, and quality of service.

6. The system of claim 5, wherein the quality of service includes guarantees related to latency, throughput and jitter.

7. A non-transitory computer readable storage medium comprising instructions for real-time managing a user equipment (UE) device configured to be operatively coupled to a network serviced by a service provider, the medium comprising computer readable instructions that, when executed on a system, cause the system to at least:
- receive from the network at an Evolved Packet Core (EPC) proxy unit standard Internet Protocol (IP) traffic, that is not LTE traffic, that was generated by the UE device, the UE device having an IP address, wherein the IP address is routed to the EPC proxy unit;
- identify an International Mobile Subscriber Identity (IMSI) for the UE device based on the IP address;
- request of an EPC system through the EPC proxy unit a standard session initiation based on the IMSI for the UE device;
- initiate a connection between the EPC proxy unit and a serving gateway of the EPC system for the standard IP traffic;
- perform advanced processing on the standard IP traffic by the EPC system; and
- perform one or more of usage management and policy enforcement on the standard IP traffic prior to allowing the UE device to access a public data network and after allowing the UE device to access a public data network.

8. The non-transitory computer readable storage medium of claim 7, wherein the instructions that, when executed on the system, cause the system to initiate the connection between the EPC proxy unit and the serving gateway further cause the system to establish a general packet radio service tunnelling protocol tunnel between the EPC proxy unit and the serving gateway through which the standard IP traffic is passed.

9. The non-transitory computer readable storage medium of claim 7, wherein the request through the EPC proxy unit further includes instructions that, when executed on the system, cause the system to interrogate a home subscriber server (HSS) with a mobility management entity (MME) of the EPC system in order to authenticate the IMSI of the UE device.

10. The non-transitory computer readable storage medium of claim 7, wherein the instructions that, when executed on the system, further cause the system to provision a home subscriber server (HSS) with information of an identification of the UE device, an identification of a service of the UE device, and an identification of a packet data network gateway through which the UE device can access the Internet.

11. A method executed on a computing system for real-time managing a user equipment (UE) device coupled to a network serviced by a service provider, the method comprising:
- receiving from the network at an Evolved Packet Core (EPC) proxy unit standard Internet Protocol (IP) traffic, that is not LTE traffic, that was generated by the UE device, the UE device having an IP address, wherein the IP address is routed to the EPC proxy unit;
- identifying an International Mobile Subscriber Identity (IMSI) for the UE device based on the IP address;
- requesting of an EPC system through the EPC proxy unit a standard session initiation based on the IMSI for the UE device;
- initiating a connection between the EPC proxy unit and a serving gateway of the EPC system for the standard IP traffic;
- performing advanced processing on the standard IP traffic by the EPC system; and
- performing one or more of usage management and policy enforcement of the standard IP traffic prior to allowing the UE device to access a public data network and after allowing the UE device to access a public data network.

12. The method of claim 11, wherein the initiating a connect between the EPC proxy unit and the serving gateway includes causing the system to establish a general packet radio service tunnelling protocol tunnel between the EPC proxy unit and the serving gateway through which the standard IP traffic is passed.

13. The method of claim 11, wherein the requesting through the EPC proxy unit further includes interrogating a home subscriber server (HSS) with a mobility management entity (MME) of the EPC system in order to authenticate the IMSI of the UE device.

14. The method of claim 11, wherein the method further comprises provisioning a home subscriber server with information of an identification of the UE device, an identification of a service of the UE device, and an identification of a packet data network gateway through which the UE device can access the Internet.

* * * * *